United States Patent [19]

Bauer

[11] 4,094,338

[45] June 13, 1978

[54] CONSTANT RATE FLOAT INTAKE

[76] Inventor: William J. Bauer, 422 S. Park Rd., LaGrange, Ill. 60525

[21] Appl. No.: 798,988

[22] Filed: May 20, 1977

[51] Int. Cl.² .................. G01F 11/00; E03B 11/00
[52] U.S. Cl. .................................. 137/578; 141/98; 210/242 R; 210/523
[58] Field of Search ............ 141/98; 137/578, 101.25, 137/101.27, 101.29, 152, 425; 210/242 R, 523, 525

[56] References Cited

U.S. PATENT DOCUMENTS

| | | | |
|---|---|---|---|
| 1,108,090 | 8/1914 | Barieau | 137/578 |
| 1,528,003 | 3/1925 | Yarnall | 137/578 |
| 1,803,604 | 5/1931 | Dudycha | 137/578 |
| 1,955,308 | 4/1934 | Naftel | 137/578 |
| 2,023,284 | 12/1935 | Osborn | 137/578 |
| 2,679,333 | 5/1954 | Starck | 137/578 |
| 3,311,129 | 3/1967 | Binder | 137/578 |

FOREIGN PATENT DOCUMENTS

| | | | |
|---|---|---|---|
| 669,118 | 6/1928 | France | 137/578 |
| 1,029,302 | 4/1958 | Germany | 137/578 |

Primary Examiner—William R. Cline
Assistant Examiner—H. Jay Spiegel
Attorney, Agent, or Firm—Neuman, Williams, Anderson & Olson

[57] ABSTRACT

Apparatus for achieving liquid flow at constant discharge rate from a liquid reservoir wherein the surface of liquid therein fluctuates in elevation.

7 Claims, 5 Drawing Figures

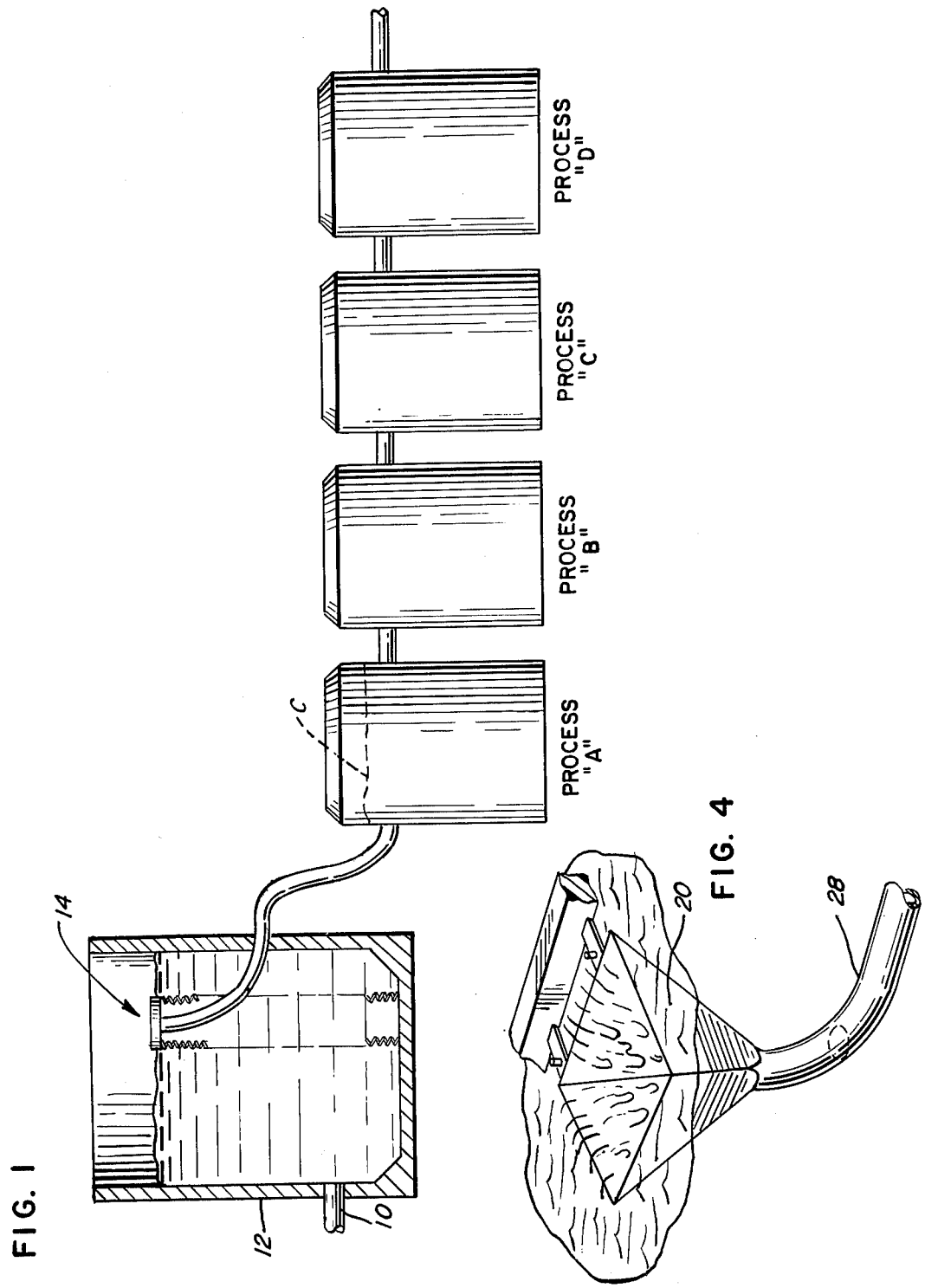

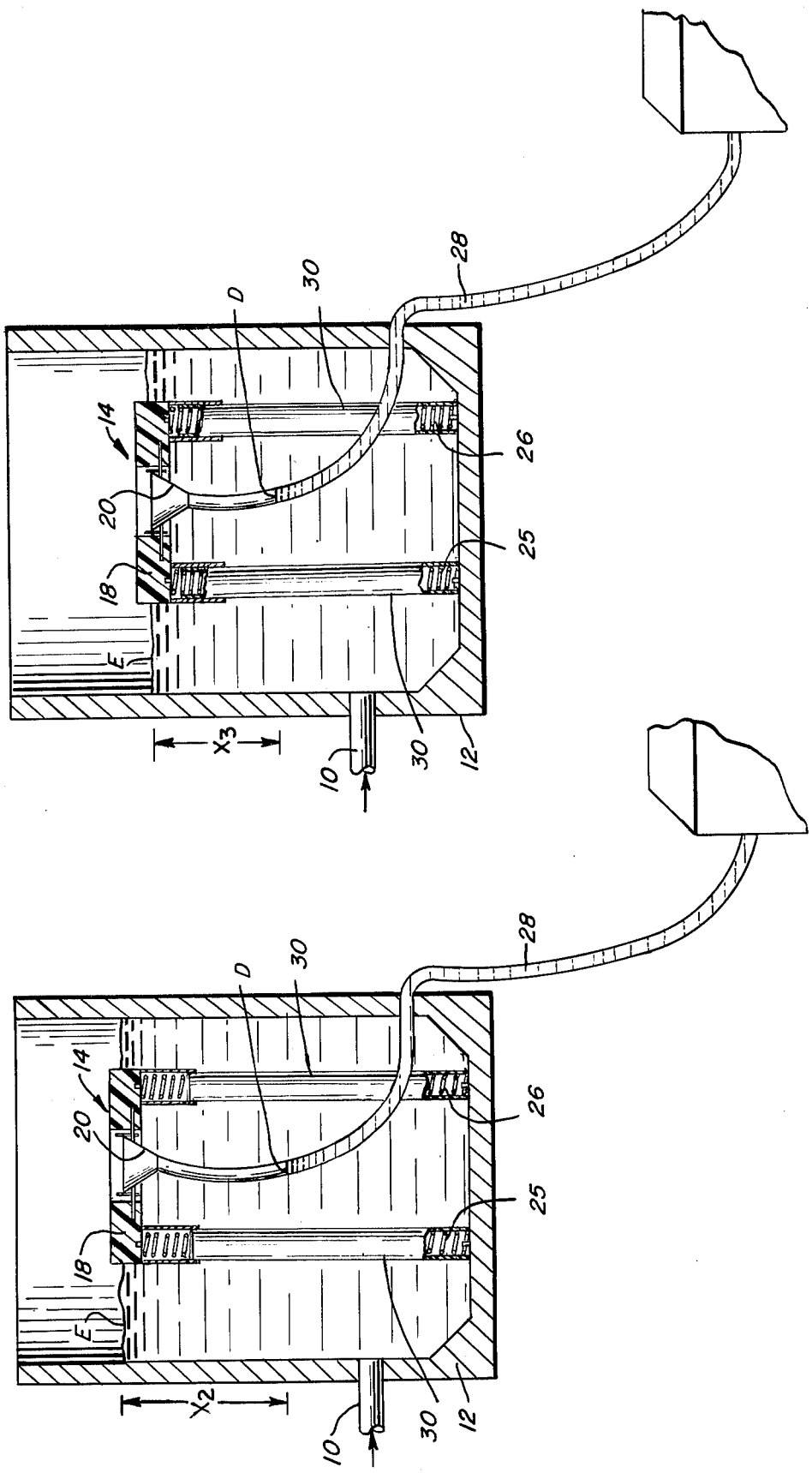

CONSTANT RATE FLOAT INTAKE

This invention relates to improvements in handling fluids.

Various operations require the transfer of liquid from one location to another. In many instances it is desired that the rate of liquid flow be substantially constant through a system even though there be considerable variation in the rate of introduction of a liquid into the system. For example, in sewage treating systems a number of treating units may be employed, with liquid from one treating operation being sequentially transferred from one treating operation to another. Generally, it is desired to maintain relatively constant the rate of liquid flow from one treating operation to another, even though the rate at which sewage is introduced into the system may vary widely. Sewage flows typically increase during the daylight hours and decrease at night. If a constant flow rate is to be achieved through treating processes, a reservoir must be used to regulate the variable inflow to the system. Variable inflow combined with constant outflow results in a fluctuating liquid level in the receiving reservoir of the system.

In the receiving reservoir, aeration may take place and heavy solids may accumulate and settle to the bottom. Lighter solids may be kept in suspension by aeration energy and may be removed with the liquid. Bacteria may metabolize the solids in suspension and in solution — a process known commonly as biological treatment. However, it is not essential to this invention that any particular process of treatment of the liquid occur in the receiving reservoir.

A substantially constant rate of flow from the receiving reservoir to subsequent treating operations is desirable for a number of reasons. A constant rate of discharge from the reservoir permits steady state treatment conditions in subsequent treating operations. For example, when using polymers in a subsequent treating operation for agglomeration of solids, it is possible to use a steady feed rate for the polymers in lieu of sophisticated controls required for changing feed rates. Similarly, filtering and other treatments, such as chlorination, are accomplished with greater ease with constant flow rates. Furthermore, by providing a substantially constant rate of flow through a sewage treatment system, the system operates with greater efficiency — the various treating units can be designed to operate continuously at a constant rate, achieving a much larger percent utilization of treatment capacity.

It is therefore a principal object of this invention to provide means for achieving a substantially constant liquid discharge rate.

The advantages of the present invention will be apparent from the following description taken in conjunction with the accompanying drawings.

For the purpose of illustration, the flow regulating means of this invention will be described in connection with a sewage treating system.

In the drawings:

FIG. 1 is a diagrammatic illustration of a sewage treating system.

FIG. 2 is an expanded cross-sectional view showing in greater detail a floating intake located at a relatively high position within the receiving reservoir.

FIG. 3 is an expanded view similar to FIG. 2, showing the floating intake in a lower position within the receiving reservoir.

FIG. 4 is a perspective view of a square "Morning Glory" type of weir suitable for use in this invention.

Figure 5:
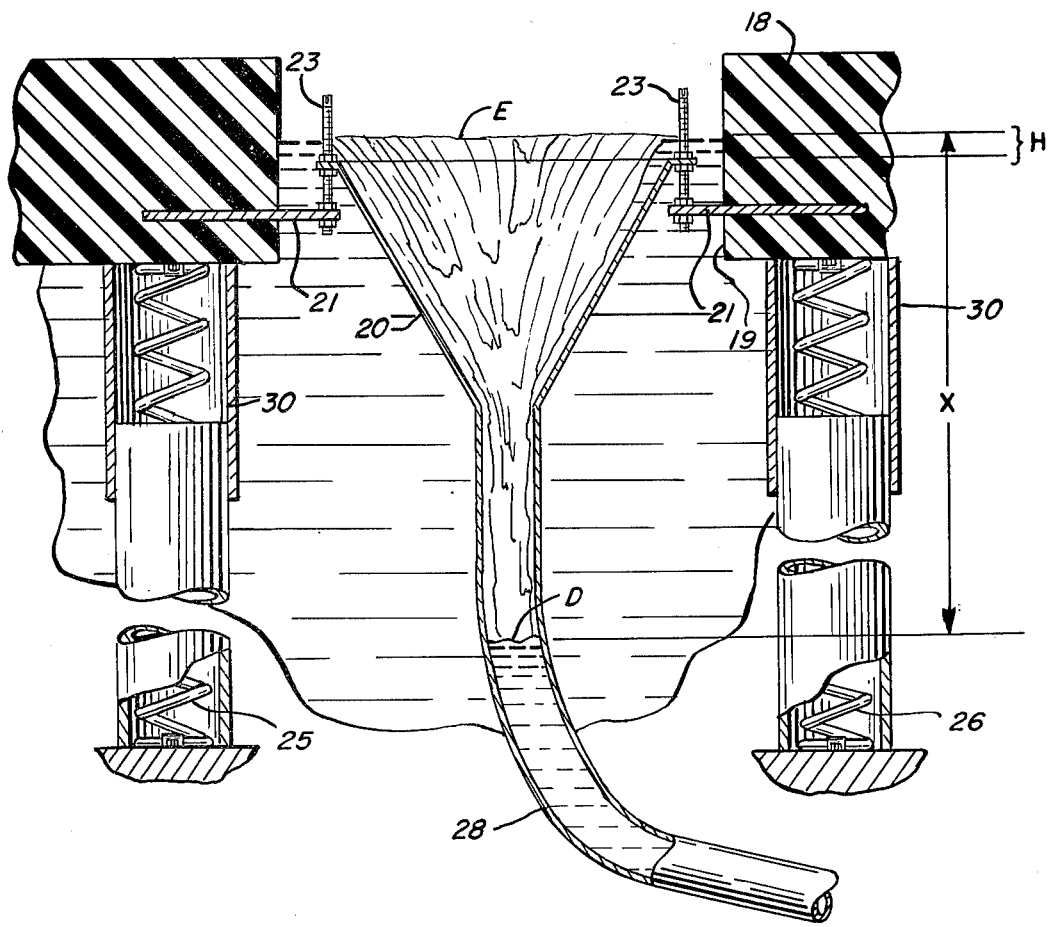
FIG. 5 is a partial, expanded cross-sectional view of the floating intake in accordance with this invention.

Referring for illustrative purposes to the drawings, raw sewage is introduced through inlet 10 into a receiving reservoir 12. In reservoir 12 the sewage may or may not be subjected to various types of treating processes, such as aeration, biological degradation, sedimentation, skimming, screening and the like. The liquid effluent from the receiving reservoir 12 is conducted to one or more treating processes, as illustratively shown in FIG. 1, which treating processes may involve sedimentation, coagulation, chemical treatment, disinfection, carbon absorption, ion exchange, filtration and the like, not necessarily in that order. It is desirable that the rate of flow through the system be at a constant rate, which rate is desirably selected to match the capacity of each of the various treating processes. To achieve this desideratum, a spring-counterbalanced floating intake, generally designated by the numeral 14, is located within receiving reservoir 12. The reservoir 12 must be displaced at a higher elevation than the next treating process unit, with the flow therebetween being caused by the gravitational attraction between the earth and the liquid.

The floating intake comprises a flotation member 18, constructed of a light buoyant material such as cork, foam-filled fiber glass, foamed plastics and the like. This flotation member 18 can be of various sizes and shapes such as round, square, rectangular, etc. For a typical liquid reservoir, a typical flotation member may be 12 feet square and one foot thick, made of foamed polyurethane covered with fiber glass. The flotation member is constructed with a cut-out center portion 19 which may be, for example, a square of two feet. Disposed within the cut-out center portion 19 of flotation member 18 is a weir member 20 which can be of conventional type such as, for example, an 18-inch "Morning Glory" type weir. In any event, the weir will be of a size which permits it to be disposed within cut-out portion 19 of flotation member 18. The weir 20 is rigidly but adjustably secured to flotation member 18 by suitable means, such as adjustable brackets 21 and 23. The means for securing weir 20 to flotation member 18 are suitable to permit vertical adjustment of the weir relative to flotation member 18. Counterbalancing springs 25 and 26 are secured to flotation member 18 and to a lower portion of reservoir 12, e.g. to the bottom, to counterbalance changes in buoyancy of the floating system as the liquid level in reservoir 12 rises and falls. By this means of counterbalancing the changes in buoyancy, the vertical position of the weir relative to the surface of the liquid in the reservoir is maintained constant despite liquid level changes, whereby the flow rate from reservoir 12 to downstream processes can be held constant even though the liquid level in the reservoir may fluctuate widely and irregularly. Conduit 28, which provides fluid communication between floating intake 14 and the subsequent treating unit, is constructed of a flexible material such as fiber glass and preferably is provided with articulated joints between the segments forming the conduit. As is seen from the drawings, conduit 28 is submerged in the liquid in reservoir 12. The length of conduit 28 depends, of course, upon the distance it is required to traverse. The diameter can likewise vary and, for example, may have a 10-inch diameter.

In operation of the flow regulating system of the invention, the liquid level C in the first process tank downstream from reservoir 12 remains constant for a given flow rate. Liquid level E in the receiving reservoir is variable depending upon the rate of introduction of sewage thereto and the storage volume of the reservoir is likewise variable, as illustrated in FIG. 2 and FIG. 3. Liquid level D within conduit 28 remains constant for a given flow rate as it is dependent upon the frictional resistance of flow through the conduit. Weir 20 varies in height above level D as flotation member 18 rises and falls resulting in a varying amount of air space within the submerged conduit 28 between liquid level E and liquid level D ($E-D=X$). Thus, when flotation member 18 is in a lower position (FIG. 3) there is less air space than when the flotation member 18 is in a higher position (FIG. 2). The additional air space (X) increases the buoyancy of the weir and the flotation member. Since the weights of the weir 20 and flotation member 18 are constant, the changes in the air space (X) result in changes in the flotation characteristics of the unit. As the liquid level E rises, the buoyancy increases whereby the submergence of flotation member 18 and weir 20 tends to decrease which, if allowed, would decrease the hydraulic head H. For example, with flotation member 18 floating at a height 24 inches above its minimum position there would be 24 inches of additional air space within conduit 28 to increase the buoyancy. This would tend to reduce the hydraulic head as compared to when flotation member 18 is in a lower position. Such changes in the hydraulic head, if allowed, would result in changes in flow rate over the weir and through conduit 28.

In accordance with this invention, springs 25 and 26, such as long coil tension springs, are employed to compensate for the change in buoyancy of flotation member 18 and weir 20 due to changes in the liquid level within reservoir 12. The force exerted by springs 25 and 26 is not adjustable, but varies automatically in accordance with Hooke's law as the liquid level in reservoir 12 rises and falls. These springs are so proportioned that the force they exert on the float-weir unit is exactly equal and opposite to the change in buoyant force on that unit as the liquid level in the reservoir 12 rises and falls. Thus, a constant head H and a corresponding constant flow rate into the downstream system will be maintained automatically despite fluctuation in the reservoir level E.

The force to be exerted by springs 25 and 26 to counterbalance the change in buoyancy is directly proportional to the cross-sectional area of the conduit 28 multiplied by the change in elevation. Thus, Let $x$ = Vertical distance between the liquid level in pipe 28 and the liquid level of the reservoir 12

$a$ = cross sectional area of inside of pipe 28

$S$ = spring constant of total system of springs 25 and 26

$w$ = unit weight of liquid in reservoir 12

$T$ = sum of all tension forces in springs 25 and 26

$T_o$ = sum of all tension forces in springs 25 and 26 when liquid level in reservoir 12 is at distance $x_o$ above liquid level in pipe 28

$x_o$ = minimum distance between liquid level in pipe 28 and liquid level in reservoir 12 which is sufficient to produce the desired constant rate of flow through pipe 28

$B_o$ = buoyant force of air in pipe 28 above liquid level in pipe 28 when liquid level in reservoir 12 is at distance $x_o$ above liquid level in pipe 28

$B$ = buoyant force of air in pipe 28 above liquid level in pipe 28 when liquid level in reservoir 12 is at distance $x$ above liquid level in pipe 28

$d$ = depth of submergence of float 18

$A$ = cross sectional area of float 18

$F = wAd$ = buoyant force of float 18

$W$ = total gravitational forces acting on float 18, including float itself, that portion of pipe 28 supported by the float, the weir and other objects fastened to float 18, and the water in pipe 28 and in other water conductors leading from the weir to pipe 28, which act to submerge float 18 until an equilibrium is achieved.

Now in any condition in which the float 18 is floating in the liquid of reservoir 12 there is an equilibrium between the vertical forces such that:

$$W + T = F + B \qquad \text{Equation (1)}$$

the two forces W and T are acting downward, and the two forces F and B are acting upward.

T and B can be expressed in terms of the spring constant and the geometric characteristics of pipe 28, such that:

$$T = T_o + S(x - x_o) \qquad \text{Equation (2)}$$

$$B = B_o + aw(x - x_o) \qquad \text{Equation (3)}$$

Equation (1) can be rewritten as follows:

$$W + T_o + S(x - x_o) = F + B_o + aw(x - x_o) \qquad \text{Equation (4)}$$

For a constant rate of flow through pipe 28, which is the desired condition, the factors W, $T_o$, F and $B_o$ must be constant.

W is constant as long as the gravitational attraction of the earth is constant, and as long as mass is not added to the floating system.

If there is constant flow rate over the weir, then the depth of submergence of float 18 which is "d" must remain constant, and if the area "A" of the float remains constant, then the buoyant force F must remain constant.

$B_o$ and $T_o$ remain constant as long as $x_o$ remains constant. The distance $x_o$ must in turn remain constant if the flow rate through pipe 28 is to remain constant, assuming that the shape of pipe 28 does not change and assuming that the viscosity of the liquid does not change because of some change in temperature, for example. In the practical situation, these factors remain constant.

From Equation (4) it is seen that $$S = aw \qquad \text{Equation (5)}$$

This equation indicates that the spring constant for the system of springs comprised by springs 25 and 26 must equal the product of the inside cross-sectional area of pipe 28 times the unit weight of the liquid.

For example, if the pipe 28 has a cross-sectional area of 1 square foot, and the weight of the liquid is 62.5 pounds per cubic foot, the spring constant S must be 1

× 62.5 = 62.5 pounds per foot of extension of the spring.

It is important for the spring constant S to remain constant with time and under varying conditions. This is achieved by use of a non-corrosive material with minimum hysteresis. Hardened or cold-drawn stainless steel wire is an example of such materials. A coil spring made of such material has the desired properties. To protect such a spring against the adverse effects of particles lodging between adjacent coils, the springs can be enclosed in a telescoping tube 30 which telescopes freely so as not to interfere with the desired constant spring constant. Such a telescoping tube is made of stainless steel or other corrosion resistant material so as to avoid the adverse effects of corrosion on the desired free telescoping action.

From the foregoing description it will be evident that the invention is not limited to use in a particular fluid handling system but finds wide applicability in various fluid handling systems in which it is desired to obtain a constant rate of flow out of a reservoir in which liquid therein varies in height.

Those modifications and equivalents which fall within the spirit of the invention are to be considered a part thereof. Thus, for example, the intake weir can be attached to the buoyant float so as to be carried thereby in various manners other than by projection into a cut-out portion thereof.

What is claimed is:

1. Liquid flow control apparatus for use in a reservoir of liquid of fluctuating level comprising a buoyant float member, an intake weir element carried by said float member, a conduit having one end thereof communicating with said weir element and extending downward therefrom to conduct flow by gravity of liquid from the weir, said conduit being yieldable to accommodate movement of said weir and float member, and counterbalancing springs which counterbalance the change in buoyancy as the buoyant float member and connected conduit rise and fall with the variable elevation of the liquid in which disposed.

2. The apparatus of claim 1 in which the counterbalancing springs are enclosed in a freely telescoping tubular enclosure to prevent extraneous particles from becoming lodged between adjacent coils of said springs.

3. The apparatus of claim 1 in which the buoyant float member has a cut-out portion and said weir projects into said cut-out portion of the float member.

4. The apparatus of claim 1 wherein the counterbalancing springs are secured to said float member and to the bottom of the reservoir.

5. The apparatus of claim 1 wherein the counterbalancing springs are formed of stainless steel.

6. The apparatus of claim 1 wherein the counterbalancing springs possess a spring constant equal to the value of the inside cross-sectional area of said conduit multiplied by the unit weight of the liquid in the reservoir in which the liquid flow control apparatus is employed.

7. A method for achieving liquid flow at constant discharge rate from a liquid reservoir wherein the surface of liquid therein fluctuates in elevation which comprises positioning on the surface of the liquid in said reservoir a buoyant float member which carries an intake weir element, connecting one end of a yieldable conduit to said weir, positioning the conduit to be submerged in the liquid in the reservoir and with the distal end of said conduit outside of said reservoir at an elevation lower than said weir whereby liquid flows from said weir through said conduit by gravity, securing counterbalancing springs to said buoyant float member whereby the springs automatically counterbalance the change in buoyancy as the buoyant float member and conduit rise and fall with the elevation of the liquid in which disposed.

* * * * *